(12) United States Patent
Spencer et al.

(10) Patent No.: US 8,594,741 B2
(45) Date of Patent: Nov. 26, 2013

(54) ADJUSTING AN AUDIO NOTIFICATION MODE OF A MOBILE COMPUTING DEVICE

(75) Inventors: Curtis Clyde Spencer, Kanata (CA); Glauco Barcotti, Kanata (CA)

(73) Assignee: Mitel Networks Corporation, Ottawa, Ontario (CA)

( * ) Notice: Subject to any disclaimer, the term of this patent is extended or adjusted under 35 U.S.C. 154(b) by 53 days.

(21) Appl. No.: 13/199,336

(22) Filed: Aug. 25, 2011

(65) Prior Publication Data
US 2013/0053109 A1 Feb. 28, 2013

(51) Int. Cl.
*H04M 1/00* (2006.01)
(52) U.S. Cl.
USPC ............ 455/567; 455/412.1; 455/414.1
(58) Field of Classification Search
USPC ............ 455/404.1, 404.2, 411, 410, 412.2, 455/414.1, 456.1, 456.3, 456.4, 456.6, 567; 705/7.19
See application file for complete search history.

(56) References Cited

U.S. PATENT DOCUMENTS

| | | | | |
|---|---|---|---|---|
| 2008/0171559 A1* | 7/2008 | Frank et al. | | 455/456.5 |
| 2009/0221263 A1* | 9/2009 | Titus et al. | | 455/404.2 |
| 2010/0235422 A1* | 9/2010 | Perret | | 709/201 |
| 2012/0276878 A1* | 11/2012 | Othmer et al. | | 455/412.2 |

* cited by examiner

*Primary Examiner* — Jean Gelin

(57) ABSTRACT

A system and method for adjusting an audible notification of a mobile computing device are disclosed. The method comprises receiving an audible notification communication at a mobile communication device from an Audible Notification Signal (ANS) transmitter located at a selected location. The audible notification communication can include an identification value of the ANS transmitter and an audible notification mode value. The identification value of the ANS transmitter can be authenticated. The authentication can be communicated to the mobile computing device. An audible notification mode of the mobile computing device can then be set while the mobile communication device is at the selected location based on the audible notification value.

18 Claims, 2 Drawing Sheets

200 →

Receiving an audible notification communication at a mobile communication device from an Audible Notification Signal (ANS) transmitter located at a selected location, wherein the audible notification communication includes an identification value of the ANS transmitter and an audible notification mode value. — 210

Authenticating the identification value of the ANS transmitter. — 220

Setting the mobile computing device to an audible notification mode while the mobile communication device is at the selected location, based on the audible notification value. — 230

ADJUSTING AN AUDIO NOTIFICATION MODE OF A MOBILE COMPUTING DEVICE

BACKGROUND

The rapid development of mobile phones and other types of computing devices has significantly enhanced people's ability to communicate. Many people choose to communicate with others throughout the day via telephone, text messaging, and social networking. The omnipresent ability to communicate has provided many benefits, including an increase in productivity and socialization.

However, as often happens when rapid technological advances occur, the social norms for communicating have not kept up with the ability to communicate. The ability to communicate around the clock or otherwise use a mobile computing device at substantially any location does not necessarily infer that it is proper to do so. Mobile computing devices can often cause disruptions in conversations, meetings, classrooms, and social activities as phone calls, voice mail, and text message alerts are received. These disruptions can reduce the effectiveness and interrupt the flow of the environment in which they occur.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein.

Figure 1:
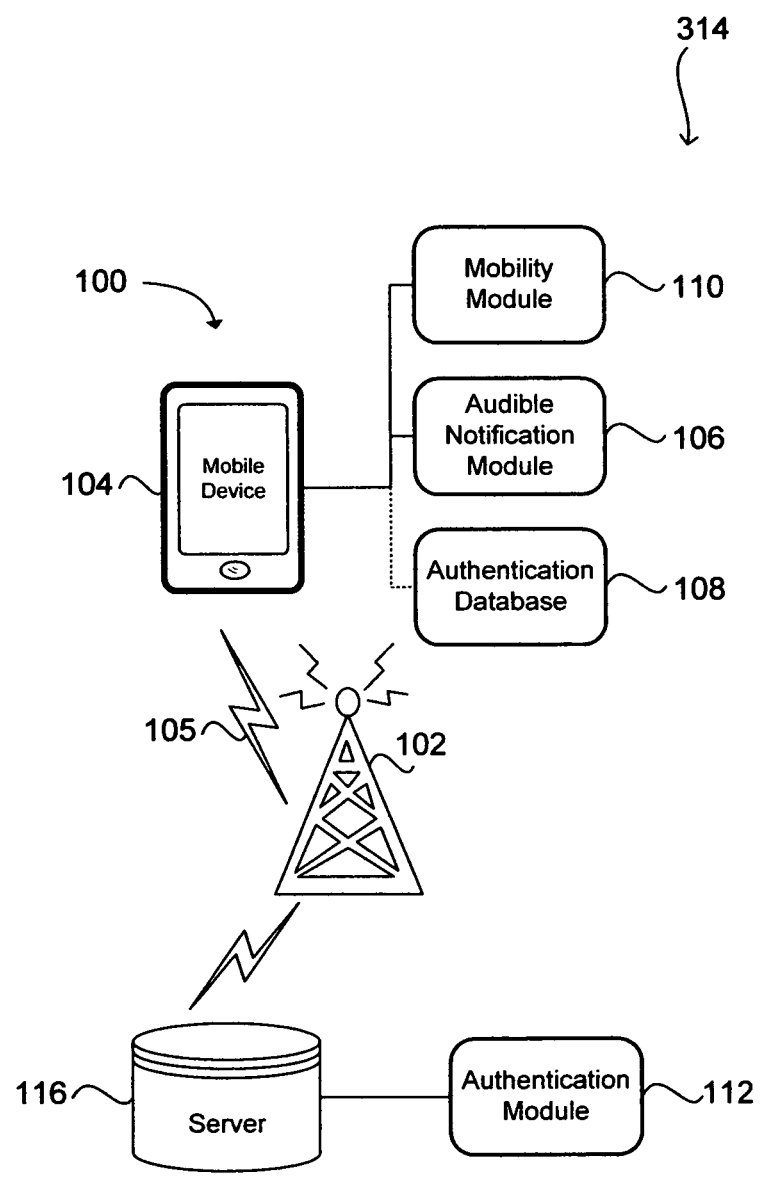
FIG. 1 illustrates an example diagram of an audible notification adjustment system for a mobile communication device in accordance with an embodiment of the present invention.

Reference will now be made to the exemplary embodiments illustrated, and specific language will be used herein to describe the same. It will nevertheless be understood that no limitation of the scope of the invention is thereby intended.

DETAILED DESCRIPTION

Definitions

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

As used herein, the term "mobile computing device" refers to a computing device capable of wireless digital communication such as a smart phone, a tablet computing device, a laptop computer, a multimedia device such as an IPod Touch®, or other type computing device that provides text or voice communication.

As used herein, a "server" refers to a physical computer dedicated to running one or more service programs used to serve the needs of programs running on other computing devices that are in communication with the server. The service program(s) can serve the needs or requests of other programs which may or may not be running on the same computer. A server can be a system comprised of software and hardware that is dedicated to a specific purpose such as a database server, a file server, a mail server, a print server, a telephony server, a credentials server, and so forth. Alternatively, a single server can be used to provide multiple services.

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

Mobile computing devices can be an important tool for learning and productivity. However, they can also be a considerable distraction. The use of mobile computing devices in enclosed environments, such as a class room setting, a business meeting, or a social setting such as a party, a playhouse, or a movie theater, can interrupt the flow of the environment in which they occur.

For instance, important meetings, movies, plays, and other types of events may be interrupted repeatedly by telephone calls, voice mail, and text message alerts. Educational environments such as a formal classroom or informal teaching environments such as a board room can also be disturbed by alerts from mobile computing devices.

To enable mobile computing devices to be used to enhance productivity, while reducing potential deleterious effects such as unwanted audio alerts and other types of distractions, a mobile computing device can be configured to automatically enable an audio notification mode to be adjusted when the mobile communication is at a selected location. For example, a person entering a concert hall, a theater, a play house, a church, a library, a meeting venue, a hospital, a national park, or other type of building or location can have the audible notification(s) on his or her mobile computing device automatically adjusted.

The type of audible notification mode may be selected based on the type of location. For instance, in a movie theater, the mobile computing device may be set so that the mobile computing device does not inform a user of a mobile computing device of an incoming call with any sort of audible setting to keep the theater quiet and discourage the user from using his or her mobile computing device in the theater. Moreover, the mobile computing device may also have its screen turned off or dimmed to reduce or eliminate light pollution in the darkened theater. Alternatively, in a business meeting, each participant may have their mobile computing devices set to identify a user of some action (i.e. a phone call or text message) using a relatively quiet notification mechanism such as a vibrate mode. This can allow the user to stand up and exit the meeting in order to respond to the notification, if the notification warrants such an action.

In one embodiment, adjusting the audible notification of a mobile computing device can be accomplished by transmitting a signal to each mobile computing device at a selected location. Each mobile computing device can be configured to receive the signal. The signal can include information instructing the mobile computing device to change an audible notification setting, such as a ring tone, a voice message tone, an email tone, a text tone, or other type of audio alert to a desired mode. For example, the audible notification setting may be set to a silent mode, a vibrate mode, or a substantially quiet mode. The substantially quiet mode may allow a ring notification to occur near its lowest output setting. The substantially quiet mode may be used in locations where lower levels of noise are typically acceptable, such as a library or hospital.

In one embodiment, an Audible Notification Signal (ANS) transmitter can be placed at a selected location. The ANS transmitter can have an adjustable power output that enables the signal to be communicated over a predetermined distance. For instance, the power output for the ANS transmitter may be adjusted to allow the signal to be received by a mobile computing device over a radius of 3 meters to 500 meters or more. While the term radius is used in this example, the ANS transmitter can include an antenna configured to output the signal over a radiation pattern having a non-circular shape. One or more antennas associated with the ANS can be configured to output the signal over an area having a desired shape, such as an oval, square, rectangle, ellipse, and so forth.

In one embodiment, the signal can be communicated to the mobile computing device using a standardized communication protocol. For example, the Institute of Electrical and Electronics Engineers (IEEE) 802.16 standard or the Third Generation Partnership Protocol (3GPP) Long Term Evolution (LTE) standard may be used to communicate the signal to mobile computing devices configured to communicate using these standards. Other standards such as the Global Standard for Mobile Communications (GSM) or other cellular type wireless communication standards may be used.

The use of cellular communication standards to format the signal from the ANS transmitter can enable a variety of different types of mobile computing devices to receive the signal and act on the information carried by the signal. However, at public locations such as a church or a theater, there can be a relatively large number of diverse types of mobile computing devices that operate using different wireless communication standards. In order to effectively communicate with each mobile computing device at a selected location, it may require a number of different types of transceiver hardware and/or software designs.

One option to overcome these difficulties is to communicate the signal from the ANS transmitter using a local wireless communication standard, such as IEEE 802.11, commonly referred to as WiFi, or a Personal Area Network (PAN) wireless standard, such as IEEE 802.15, that includes, but is not limited to Bluetooth®, ultra-wideband (UWB, over IEEE 802.15.3), and ZigBee® (over IEEE 802.15.4). Other types of local wireless communication standards may be used as well.

Many types of mobile computing devices are configured to communicate via one or more local wireless communication standards, such as those previously listed. For example, many mobile computing devices are configured to communicate using WiFi. A WiFi signal transmitted by the ANS transmitter can be received by a plurality of mobile computing devices at a selected location even if many of the mobile computing devices communicate via different cellular communication standards.

Mobile computing devices that are configured to receive communication via both a cellular communication standard and a local communication standard typically receive the cellular and local communications via different routes. It is assumed that communications received via the cellular communication standard come from a trusted source, such as a service provider's cell towers. A user does not need to approve signals arriving from the cell towers before they are received, even if signals have not been previously communicated from a cell tower. The cell towers can send signals that include information instructing the mobile computing device to automatically perform basic functions, such as setting the device's clock, configuring the device for a selected time zone, or activating an audible notification on the device when a telephone call, voice mail, text, email, or other type of information is received.

In contrast, information that is received at a mobile computing device via a local communication standard, such as WiFi or Bluetooth®, is typically not assumed to come from a trusted source. A user of the mobile computing device often has to manually approve the mobile computing device to communicate with a transceiver such as a wireless router that is communicating information via the local communication standard. Thus, a signal containing information that is communicated to a mobile computing device via WiFi may not automatically be received and acted upon at the mobile computing device without manual intervention by a user. This need for manual intervention can limit the effectiveness of using the ANS transmitter to change a mobile computing device's audible notification settings.

In accordance with one embodiment, the ANS transmitter can be configured to be a trusted source that is operable to communicate via a local communication standard. For example, the ANS transmitter can be assigned a unique identification value. The identification value can be communicated by the ANS transmitter to each mobile computing device. The mobile computing device can include a list of identification values that are known to be trusted. When a communication is received from the ANS transmitter via a local communication standard that includes an identification value that is associated with a trusted source, communication from the ANS transmitter can be authenticated as coming from a known trusted local source. The unique identification value can be encrypted to provide a substantially secure communication from the transmitter to the mobile computing device. Information that is received from the known trusted local source can be automatically acted upon at the mobile computing device without the need for manual approval by the user.

Verification of the identification value communicated by the ANS transmitter may be achieved by authenticating the identification value with a secondary source, such as a server accessible through a website or a wireless cellular service provider. For example, the website or service provider can include a database of identification values assigned to a plurality of ANS transmitters, respectively. Each identification value for an ANS transmitter can be associated with another identification number that is unique to the hardware, such as a Media Access Control (MAC) address. When a mobile computing device receives a signal from the ANS transmitter, the mobile computing device can be configured to authenticate the identification number by communicating the authentication number and the MAC address of the ANS transmitter to the website or service provider. Alternatively, one of the values, such as the MAC address of the ANS transmitter, may be communicated by the ANS transmitter to the authentication site (the server accessible through the website or service provider). The ANS transmitter may communicate the MAC address via a wired connection so that both the identification value and the MAC address cannot be detected by a nefarious source. The server at the website or service provider can check to see if the identification value is matched with the MAC address registered for the ANS transmitter.

As previously discussed, the identification value communicated to a mobile computing device by the ANS transmitter may be scrambled or encrypted to further enhance security. In addition, an added layer of security such as a geographic match may be added. Many types of mobile computing devices have the ability to geo-locate the approximate position of the mobile computing device based upon global positioning satellites, triangulation of cellular signals, and the like. The database containing the identification value and MAC address for each ANS transmitter can also include the approximate geographic location of the ANS transmitter. If the mobile computing device is not within a selected distance of that geographic location, such as the 3 meter to 500 meter range of the ANS transmitter, then the information in the signal may not be acted upon. The selected distance that is allowed by the database may depend on a preset range of the ANS transmitter. Alternatively, the ANS transmitter may have a variable range, and the range in the database may be set at a maximum range of the ANS.

While the MAC address and a unique identification value have been used as an example, other types of authentication may also be performed, as can be appreciated. Any type of authentication may be used in which the trustworthiness of an ANS transmitter can be substantially established at the mobile computing device to allow information communicated from the ANS transmitter to be automatically received without manual user intervention. For example, when a user first attends a theater or visits a hospital that includes one or more ANS transmitters, a user will not need to manually permit the mobile communication device to communicate with the ANS transmitter(s). Rather, as long as the ANS transmitters are authenticated properly, they can communicate with each user's mobile communication device without manual intervention.

In another embodiment, the mobile computing device may not be preconfigured to authenticate the ANS transmitter identification. Accordingly, an application containing an authentication module can be installed on the mobile computing device that enables the device to authenticate an ANS transmitter via a database associated with the authentication module or via a database located on a server accessible through a network, the internet, via a service provider, and so forth, as previously discussed.

To encourage the user to download the application, the application can be associated with positive rewards for a user. For instance, a user may receive coupons, discounts, frequent user points, or other rewards for businesses associated with locations at which an ANS transmitter is located. Information regarding the rewards may be communicated to the mobile computing device via the ANS transmitter. Alternatively, when a mobile computing device receives a communication from an ANS transmitter, the rewards may be received from a third party source.

Once the ANS transmitter has been authenticated, the information in the signal communicated from the ANS transmitter can be acted upon by the mobile computing device. The signal can include information regarding the type of audible notification that can be performed by the mobile computing device when it is within a range of the ANS transmitter.

For example, the audible notification modes can include a silent mode in which no audible notification is performed by the mobile computing device, a vibrate mode in which a substantially non-audible notification can be performed, such as a vibrate notification, and a quiet mode, in which the mobile computing device is set to its lowest volume audible notification setting. In addition, a dark mode may be set in which the mobile communication device's display screen is turned off or substantially darkened, as previously discussed.

In one example embodiment, the information carried on the signal can include a message that is formatted as follows:

ANS ID: a 64 bit number (0 to 2^64-1)
MAC Address a 48 bit or 64 bit number
Message ID: a 8 bit number (0 to 255)
Message Type: a 8 bit number (0 to 255)
Message: a 256 byte message (optional).

The ANS ID can be the unique value assigned to the ANS. The unique value may be assigned by a manufacturer, or set by a user at a later date. The ANS ID can be stored in an authentication database at the authentication site. The MAC address is typically assigned by the manufacturer of the transmitter. The MAC address for each ANS transmitter can also be included in the authentication database and associated with the ANS ID for each ANS transmitter. In one embodiment, each message received from the ANS transmitter may also have an identification value. The Message ID may also be authenticated. Alternatively, once an ANS transmitter has been authenticated, the mobile computing device may be configured to automatically act on information received from the ANS.

The information can also include a Message Type indicator. The Message Type value can indicate what action the mobile computing device is to perform. For instance:
0=silent/dark mode;
1=silent mode
2=vibrate mode;
3=quiet mode;
4=text message.

The silent/dark mode can be set for entertainment venues, such as play houses, theaters, operas, symphony halls, and so forth, wherein the activation of a bright display on a mobile computing device can often cause as much or more interference as an audible alert. In the silent/dark mode, the screen on the user's mobile computing device can be turned off or substantially dimmed. The silent, vibrate, and quiet modes have been previously discussed.

The ANS transmitter can also be configure to communicate a text message. The text message can include information that is pertinent at the location of the ANS transmitter. The text message may be repeatedly communicated by the ANS transmitter at a predetermined rate, such as once per minute. Each text message can be associated with a specific message ID. The mobile communication device can be configured to store the message ID and only display text messages that have not been previously received for a predetermined time period, such as once per day, once per month, once per year, or so forth. In one embodiment, only new messages are presented to the user.

The ANS transmitter can communicate with the mobile communication device at a predetermined rate. For instance, a message may be communicated once every minute. If the mobile communication device does not receive a signal from the ANS transmitter in a predetermined period, such as within two minutes, the settings of the mobile communication device, such as the audible notification settings on the mobile communication device, can be reset to their previous values. This enables a mobile communication device to miss one transmission from the ANS transmitter without being reset. The mobile communication device can be set to revert to the previous audible notification settings after a predetermined number of messages have not been received. The number of missed messages can be set based on the needs of the system and the type of location at which the ANS transmitter is located.

In another embodiment, the mobile computing device can be configured to revert the audible notification settings to the preexisting values at a faster rate based on environmental factors. For example, if the ANS transmitter is located at a movie theater, playhouse, or other entertainment venue wherein the people at the location are generally seated, the mobile computing device can be configured to revert the audible notification settings to the previous value within a relatively short time period, such as 15 seconds after the mobile computing device detects that a user is walking. This form of detection can be accomplished using accelerometers, gyroscopes, and other types of sensors that are often included in mobile computing devices, as can be appreciated.

In one example, a patron may decide to leave his or her seat and walk out of the theater to make or receive a phone call. The patron's mobile computing device can detect walking and revert, after a period of 15 seconds, to the preexisting settings, thereby allowing the patron to exit the theater and then make or receive the call independent of the settings established by the ANS transmitter. This enables the user to quickly use his or her mobile computing device without interference from the ANS transmitter, while also substantially eliminating unintended audio notifications from occurring within the theater or other location of the ANS transmitter.

Each mobile computing device can also include an override feature, wherein a user can instruct the mobile computing device to ignore the signals received from the ANS transmitter when conditions require a use of the mobile computing device at its standard operational settings.

In another embodiment, a system 100 for adjusting an audible notification mode of a mobile computing device 104 is disclosed, as provided in the example diagram of FIG. 1. An ANS signal transmitter 102 is configured to send an audible notification communication 105 to a plurality of mobile computing devices 104 at a selected location. The audible notification communication comprises digital data transmitted by the ANS signal transmitter that includes an identification value of the ANS transmitter and an audible notification mode value that is desired for each mobile computing device at the selected location.

The system 100 further comprises an audible notification module 106 that is configured to operate on the mobile computing device. The audible notification module can authenticate the identification value communicated by the ANS transmitter. In one embodiment, the audible notification module can authenticate the identification value via an authentication database 108 that is located on the mobile computing device 104. Alternatively, the authentication may be performed by communicating with an authentication module 112 located on a server 116 in communication with the mobile communication device. The mobile communication device may communicate with the server through a local communication standard, such as WiFi, or through a cellular communication standard used by the mobile communication device. Once the identification value has been authenticated, the audible notification module can set the mobile computing device to the audible notification mode received from the ANS transmitter. The audible notification mode can revert to the previous mode if movement such as walking or running is detected by a mobility module 110 located on the mobile communication device.

Figure 2:
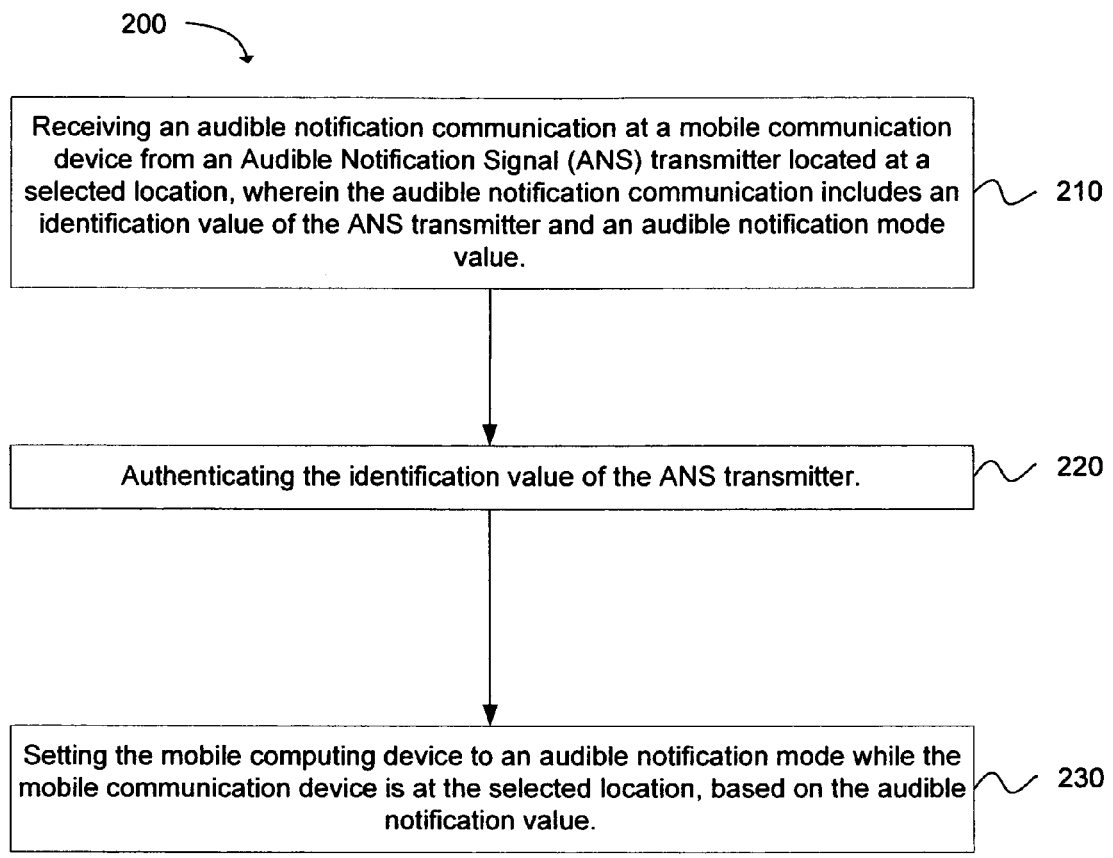
FIG. 2 depicts a flow chart of a method for adjusting an audible notification of a mobile computing device in accordance with an embodiment of the present invention.

In another embodiment, a method 200 for adjusting an audible notification mode of a mobile computing device is disclosed, as depicted in the flow chart of FIG. 2. The method comprises receiving 210 an audible notification communication at a mobile communication device from an Audible Notification Signal (ANS) transmitter located at a selected location. The audible notification communication can include an identification value of the ANS transmitter and an audible notification mode value. The identification value of the ANS transmitter can be authenticated. The authentication may be performed at the mobile computing device, or via a remote server accessible through a network, the internet, or via a wireless service provider, as previously discussed. Once the ANS transmitter has been authenticated, the mobile computing device can be set 230 to an audible notification mode based on the audible notification value that was received from the ANS transmitter. The ANS transmitter can continue to transmit the audible notification communications at a predetermined rate. The mobile communication device can stay in the mode set by the ANS transmitter while it is located within the transmission range of the ANS transmitter.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

It should be understood that many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Various techniques, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A method for adjusting an audible notification mode of a mobile computing device, comprising:
    receiving an audible notification communication at a mobile communication device from an Audible Notification Signal (ANS) transmitter located at a selected location, wherein the audible notification communication includes an identification value of the ANS transmitter and an audible notification mode value;
    authenticating the identification value of the ANS transmitter;
    setting the mobile computing device to an audible notification mode while the mobile communication device is at the selected location, based on the audible notification value; and
    reverting an audible notification setting of the mobile computing device to a previous value when at least one audible notification communication is not received at the mobile computing device.

2. The method of claim 1, further comprising receiving the audible notification communication at the mobile communication device from the ANS transmitter, wherein the ANS transmitter has a user selectable transmission range from about 3 meters to 500 meters.

3. The method of claim 1, wherein receiving the audible notification communication further comprises receiving the audible notification communication at the mobile communication device at a predetermined frequency.

4. The method of claim 1, wherein authenticating the identification value of the ANS transmitter further comprises comparing the identification value of the ANS transmitter with an expected Media Access Control (MAC) address for the ANS transmitter.

5. The method of claim 1, wherein authenticating the identification value of the ANS transmitter further comprises comparing a location of the mobile computing device with an expected location of the ANS transmitter.

6. The method of claim 1, wherein authenticating occurs through at least one of a module operable on the mobile computing device, a website in communication with the mobile computing device and a mobile service provider for the mobile computing device.

7. The method of claim 1, wherein setting the mobile communication device to the audible notification mode based on the audible notification value further comprises setting the mobile communication device to at least one of a silent mode, a vibrate mode, and a quiet mode.

8. A system for adjusting an audible notification of a mobile computing device, comprising:
    an Audible Notification Signal (ANS) transmitter configured to send an audible notification communication to a plurality of mobile computing devices at a selected location, wherein the audible notification communication includes an identification value of the ANS transmitter and an audible notification mode value; and
    an audible notification module configured to;
    receive said audible notification communication;
    operate on a mobile computing device;
    authenticate the identification value;
    set the mobile computing device to the audible notification mode received from the ANS transmitter while the mobile computing device is at the selected location; and
    revert an audible notification setting of the mobile computing device to a previous value when at least one audible notification communication is not received at the mobile computing device.

9. The system of claim 8, further comprising an authentication module configured to receive the identification value of the ANS transmitter from the mobile computing device and authenticate the identification value by comparing the identification value with known information regarding the ANS transmitter.

10. The system of claim 8, further comprising communicating a Media Access Control (MAC) address of the ANS transmitter from one of the mobile computing device and the ANS transmitter to the authentication module to authenticate the identification value by matching the identification value of the ANS transmitter with the MAC address of the ANS transmitter.

11. The system of claim 9, wherein the authentication module is located on at least one of the mobile communication device and a server in communication with the mobile communication device.

12. The system of claim 8, wherein the ANS transmitter is configured with a variable power output to transmit the audible notification communication a distance from about 3 meters to about 500 meters.

13. The system of claim 8, wherein the ANS transmitter is configured to transmit the audible notification communication at a selected frequency.

14. The system of claim 8, further comprising a mobility module configured to revert an audible notification setting of the mobile computing device to a previous value when the user is determined to be mobile for a predetermined period of time.

15. A computer program product, comprising a non-transitory computer usable medium having a computer readable program code embodied therein, said computer readable program code adapted to be executed to implement a method for adjusting an audible notification of a mobile computing device, comprising:

receiving an audible notification communication at a mobile communication device from an Audible Notification Signal (ANS) transmitter located at a selected location, wherein the audible notification communication includes an identification value of the ANS transmitter and an audible notification mode value;

authenticating the identification value of the ANS transmitter, setting the mobile computing device to an audible notification mode based on the audible notification value while the mobile communication device is at the selected location; and reverting an audible notification setting of the mobile computing device to a previous value when at least one audible notification communication is not received at the mobile computing device.

16. The computer program product of claim 15, wherein authenticating the identification value of the ANS transmitter further comprises comparing the identification value of the ANS transmitter with an expected Media Access Control (MAC) address for the ANS transmitter.

17. The computer program product of claim 15, wherein authenticating the identification value of the ANS transmitter further comprises comparing a location of the mobile computing device with an expected location of the ANS transmitter.

18. The computer program product of claim 15, wherein authenticating occurs through at least one of a module operable on the mobile computing device, a website in communication with the mobile computing device and a mobile service provider for the mobile computing device.

* * * * *